US006105562A

United States Patent [19]

Akagi et al.

[11] Patent Number: 6,105,562

[45] Date of Patent: Aug. 22, 2000

[54] STARTING CONTROL VALVE ASSEMBLY FOR A MULTIPLE THROTTLE

[75] Inventors: Takashi Akagi; Toshiyuki Kubota, both of Wako, Japan

[73] Assignee: Honda Giken Kogyo Kabushiki Kaisha, Tokyo, Japan

[21] Appl. No.: 09/159,763

[22] Filed: Sep. 24, 1998

[30] Foreign Application Priority Data

Sep. 24, 1997 [JP] Japan .................................... 9-259120

[51] Int. Cl.[7] ...................................................... B60T 11/24

[52] U.S. Cl. ....................................... 123/580; 123/179.18

[58] Field of Search .............................. 123/59.5, 179.18, 123/336, 580, 585

[56] References Cited

U.S. PATENT DOCUMENTS

| | | | |
|---|---|---|---|
| 4,069,802 | 1/1978 | Ross | 123/179.18 |
| 4,452,190 | 6/1984 | Ross | 123/179.18 |
| 4,462,357 | 7/1984 | Lockhart | 123/336 |
| 5,121,719 | 6/1992 | Okazaki et al. | 123/179.14 |
| 5,150,673 | 9/1992 | Hoshiba et al. | 123/179.15 |
| 5,181,491 | 1/1993 | Izumi et al. . | |
| 5,845,626 | 12/1998 | Hou | 123/585 |

FOREIGN PATENT DOCUMENTS 2305598 10/1976 France .

OTHER PUBLICATIONS

Patent Abstract of Japan, vol. 017, No. 407 (M01454), JP 05079403, Keihin Seiki MFG Co Ltd, Mar. 30, 1993.

*Primary Examiner*—Noah P. Kamen
*Attorney, Agent, or Firm*—Birch, Stewart, Kolasch & Birch, LLP

[57] ABSTRACT

To simplify the idle opening amount between each cylinder and simplify the structure of a throttle body, starter valves having tuning screws capable of respectively adjusting the flow amount of air supplied to the intake port of each throttle body are arranged in a line in a valve body. Due to the provision of the valve body, a joint pipe for supplying air having a flow amount is adjusted using the starter valves. The throttle bodies are connected through a bypass tube to the valve bodies such that the valve bodies are separated from the throttle bodies.

18 Claims, 7 Drawing Sheets

STARTING CONTROL VALVE ASSEMBLY FOR A MULTIPLE THROTTLE

BACKGROUND OF THE INVENTION

1. Field of the Invention

This invention relates to a starting control valve assembly for a multiple throttle provided in a multiple throttle body of a multiple cylinder engine of a vehicle such as a motorcycle 2. Description of Related Art In a multiple throttle valve body of a multiple cylinder engine of a motorcycle, etc., as shown in FIG. 7, a starting control valve 2 is provided in each throttle body.

This starting control valve 2 has starter valves 3, and is connected through these starter valves 3 to the inside of an air cleaner 4 and an intake port 5 of a throttle body 1.

The starter valve 3 is formed in the throttle body 1, and has a tuning screw 3*a* provided midway along a flow path 6 connected to the intake port 5. A valve member 3*b* provided on the tip of the tuning screw 3*a* is moved by rotating the tuning screw 3*a*. Adjusting of the degree of idle opening between each cylinder is carried out by adjusting the degree of opening of the flow path 6, and adjusting the amount of intake from the air cleaner 4.

When the engine is started, the starter valve 3 of each throttle body 1 is moved backwards against a spring 3*c*, and an intake amount from the flow path 6 to the intake port 5 is increased.

In FIG. 7, reference numeral 6*a* is a pipe connecting the flow path 6 and the air cleaner 4, reference numeral 7 is an injector for injecting fuel into the intake port 5 of the throttle body 1, and reference numeral 8 is an iris valve rotated by a throttle shaft 9 for adjusting an opening and closing amount of the intake port The above described starter valves 3 are individually and directly provided on the respective throttle bodies 1, which means that for each throttle body 1, the direction in which the tuning screw 3*a* faces, namely the adjusting direction, is restricted for each throttle body 1. After mounting, the throttle valves are covered by the air cleaner 4 and fuel tank, etc., making it difficult to carry out tuning between cylinders smoothly.

As well as this problem, if the above described structure is adopted, the remanufactured length of the flow path 6 forming the throttle body 1 itself is long, and the flow path 6 has a convoluted shape, which means that the manufacturing cost of the throttle body 1 is increased, bringing about an increase in the overall cost.

SUMMARY OF THE INVENTION

This invention has been conceived in view of the above described situation. An object of this invention is to provide a starting control valve assembly for a multiple throttle capable of bringing about simplification in the structure of a throttle body, and in which it is easy to adjust the extent of idle opening between cylinders of each throttle body.

In order to achieve the above described object, a starting control valve assembly for a multiple throttle according to the present invention includes a multiple throttle with multiple throttle bodies, having intake ports for introducing a mixture to each combustion chamber of a multiple cylinder engine and for supplying air from an air cleaner to said intake paths via a bypass channel. The multiple throttle of the present invention also includes starter valves having an adjusting section being capable of adjusting a flow amount of air supplied to the intake port of each throttle body integrally provided in a valve body independently of the throttle body. Each throttle body and valve body are connected through a bypass tube, and air is distributed to each intake port through the bypass tube.

In this way, the direction in which the starter valves face is not restricted by the distributive positioning of the throttle bodies, and can be freely chosen, and it is possible to obtain excellent layout design freedom.

Also, it is possible to alleviate the manufactured length of a bypass flow path in the throttle body and the convoluted shape, so that it becomes possible to reduce the manufacturing cost of the throttle body.

A starting control valve assembly for a multiple throttle according to the present invention includes the starter valves provided in the valve body arranged in a line facing in the same direction as the adjusting section.

That is, the adjusting sections of the starter valves all face in one direction and are arranged in a line. Therefore it can be made easy to adjust the starter valves using the adjusting sections, and maintenance work can be made very efficient.

A starting control valve assembly for a multiple throttle according to the present invention includes adjusting sections arranged facing towards the rear of a vehicle, above the throttle bodies and below the air cleaner.

In this way, it is possible to carry out adjustments using the adjustment sections from the rear of a vehicle.

A starting control valve assembly for a multiple throttle according to the present invention further includes the engine being a V-type engine having cylinders respectively slanting towards the front and rear of the vehicle, and the valve bodies are provided between the cylinders on one side of the vehicle and between the engine and a frame provided in the lateral direction of the vehicle.

In this way, it is possible to carry out adjustments using the adjustment section by inserting a tool between the frame and the engine.

A starting control valve assembly for a multiple throttle according to the present invention further includes the engine being an L-type engine having cylinders provided at the front side of the vehicle body and a crankcase provided from a lower end of the cylinders to the rear side of the vehicle body. Furthermore, the valve bodies are provided between a rear side of a vehicle body where the cylinders are arranged with the throttle valves provided thereon, and a frame is provided in a lateral direction of the vehicle body.

In this way, it is possible to carry out adjustment using the adjusting sections in between lateral frames at the rear of the engine.

A starting control valve assembly for a multiple throttle according to the present invention includes valve bodies arranged at a side higher than a point of connection between the throttle bodies and the bypass tube.

In this way, it is possible to favorably supply air within a flow path inside the valve body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Embodiments of a starting control valve assembly for a multiple throttle of the present invention will now be described below with reference to the accompanying drawings.

Figure 1:
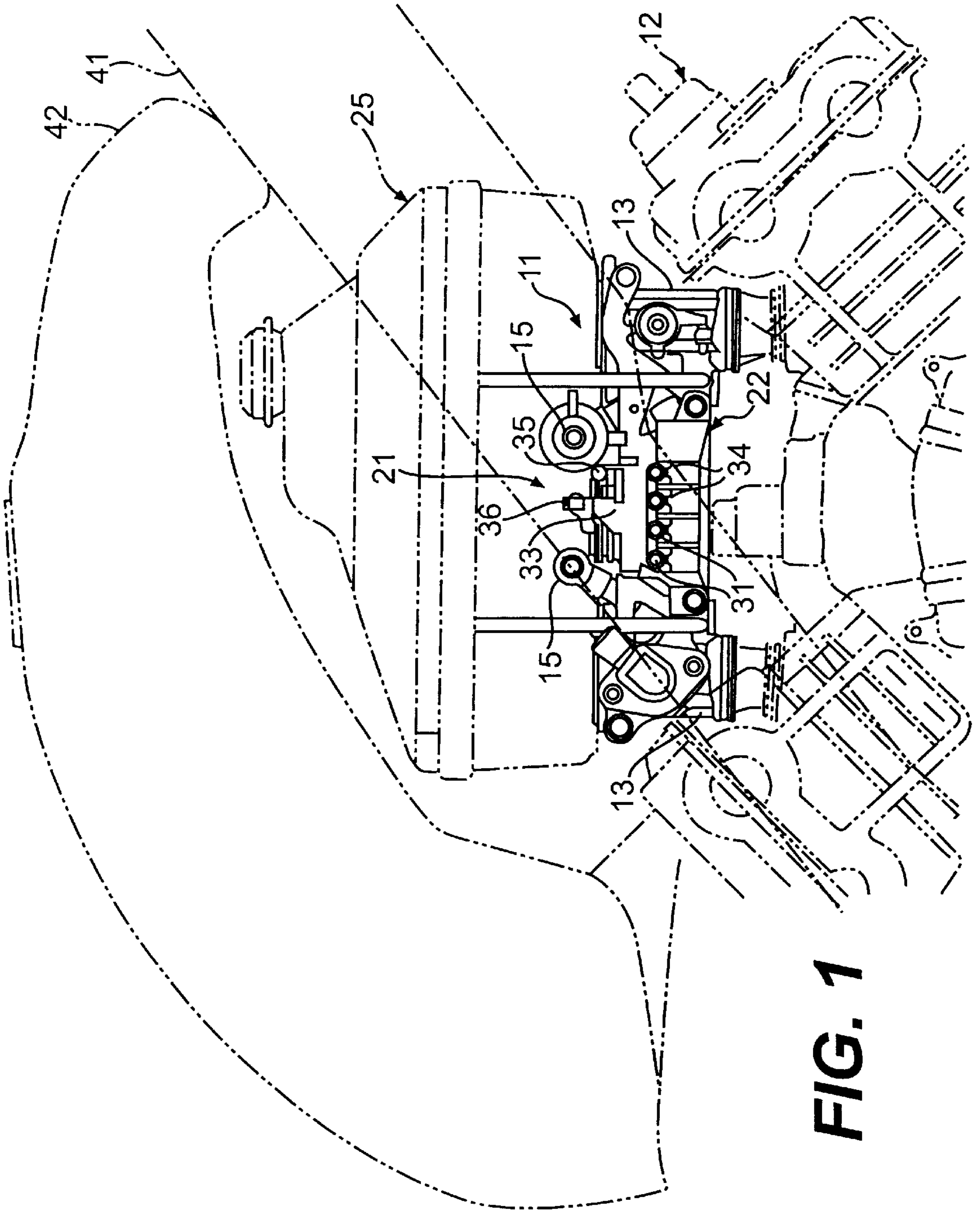
FIG. 1 is a side view of a multiple throttle body illustrating the structure and composition of a multiple throttle provided with a starting control valve assembly of an embodiment of the present invention.
Figure 2:
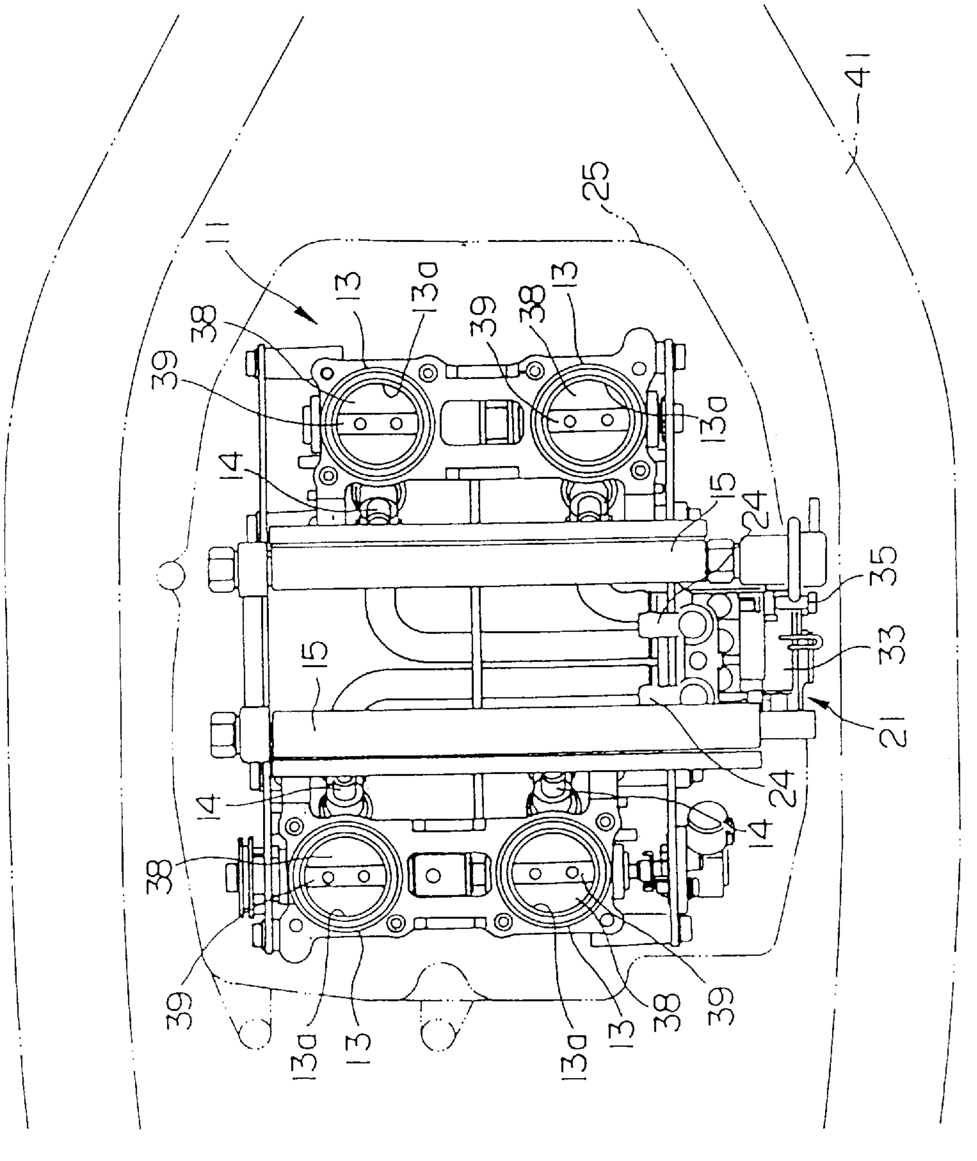
FIG. 2 is a plan view of a multiple throttle body illustrating the structure and composition of a multiple throttle provided with a starting control valve assembly of an embodiment of the present invention.
Figure 3:
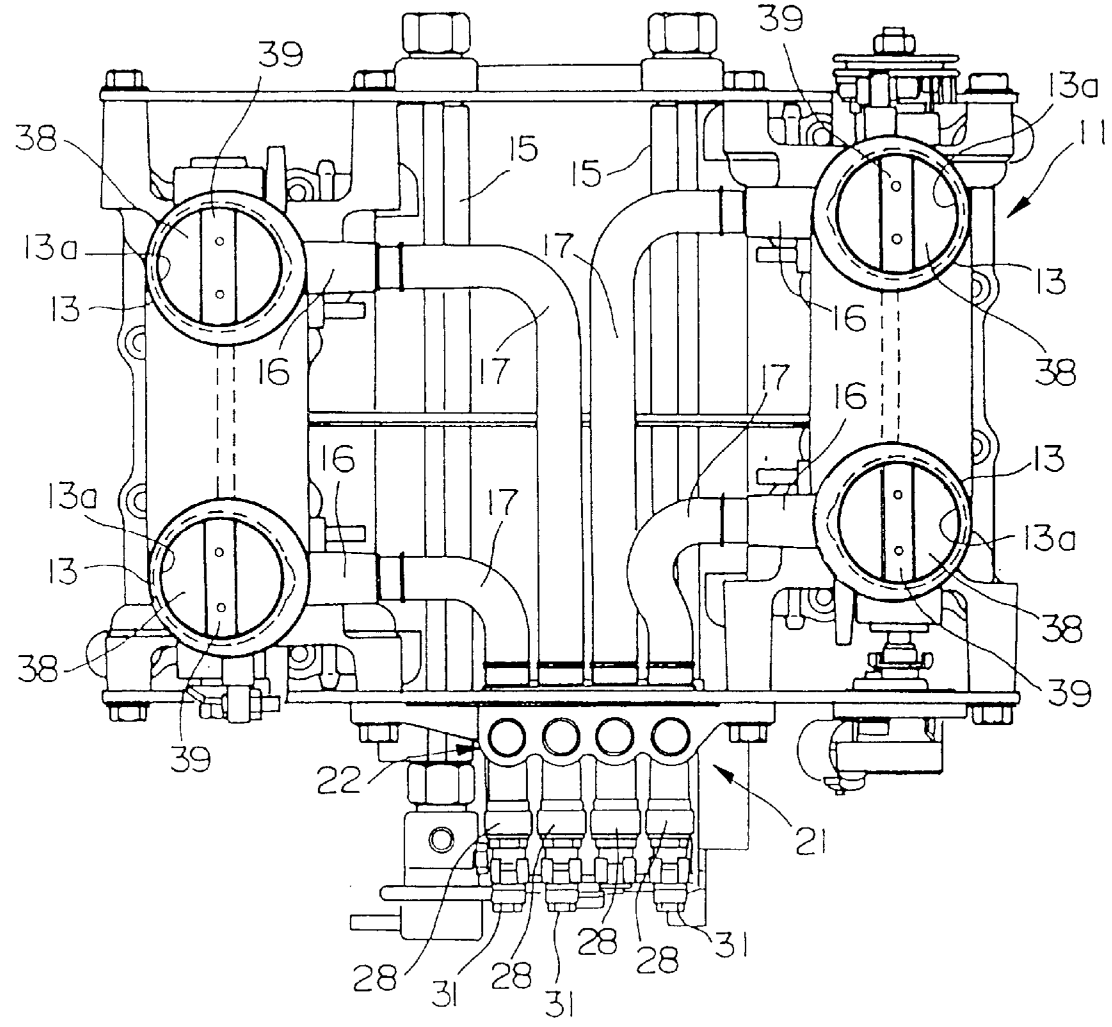
FIG. 3 is a rear view of a multiple throttle body illustrating the structure and composition of a multiple throttle provided with a starting control valve assembly of an embodiment of the present invention.

In FIG. 1 to FIG. 3, reference numeral 11 is a multiple throttle body positioned between a V-type multiple cylinder motorcycle engine 12 and an air cleaner 25. The multiple throttle body 11 comprises two pairs of throttle bodies 13 arranged so as to face each other. Injectors 14 are respectively provided on these throttle bodies 13, and fuel supply pipes 15 are connected across associated injectors 14 of the pairs of throttle bodies 13. Fuel is supplied from these fuel supply pipes 15 to each injector 14, injected from each injector 14 to each intake port 13*a* inside each throttle body 13, and supplied to the combustion chambers of the engine 12.

In each throttle body 13 constituting the multiple throttle 11 having the above described structure, a bypass tube connection section 16 is formed, and bypass tubes 17 are connected to these bypass tube connection sections 16. The bypass tubes 17 also have ends connected to the starting control valve assembly 21.

The starting control valve assembly 21 is provided on a side part of the multiple throttle body 11, and is arranged in such a way that a head 31*a* of a tuning screw of a starter valve 28 (which will be described later) can face to the side.

Reference numeral 38 in the drawings is a throttle valve for adjusting an amount of opening and closing of the intake port 13*a* and is rotated by the throttle shaft 39.

Figure 4:
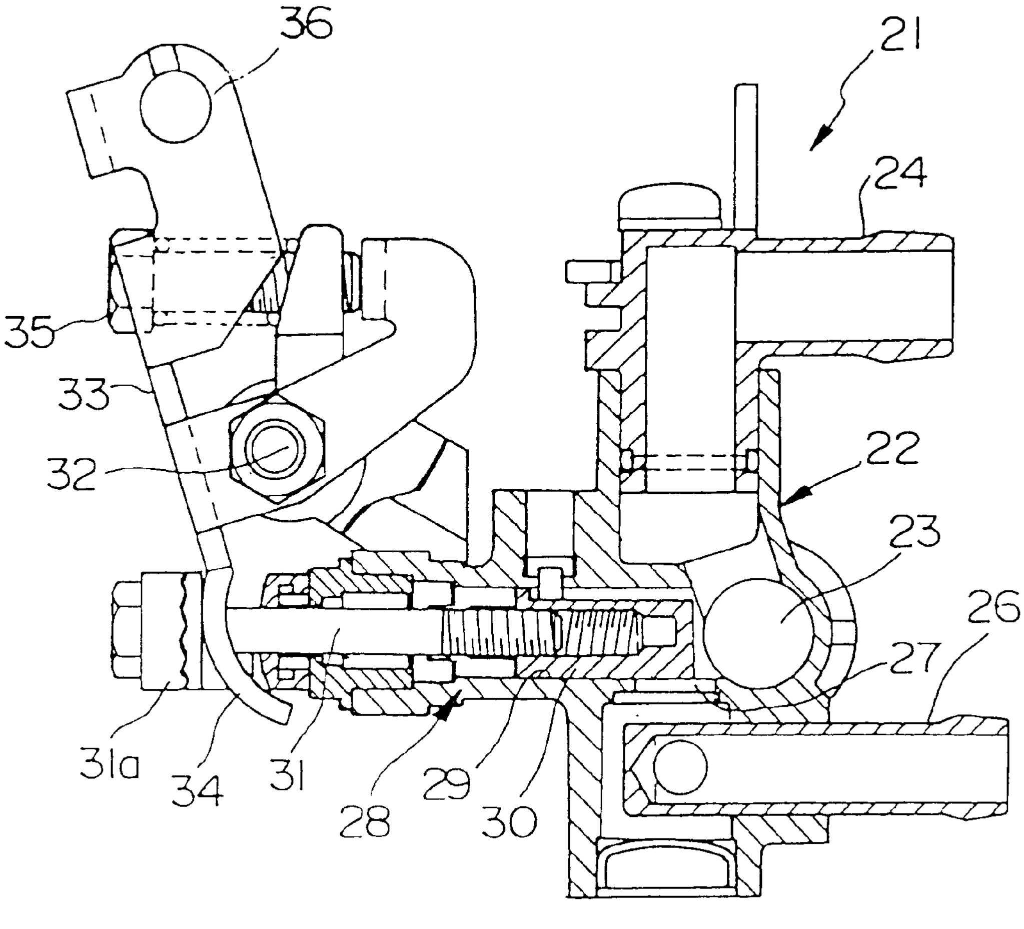
FIG. 4 is a cross sectional view illustrating the structure and composition of a starting control valve assembly of an embodiment of the present invention.

Next, the structure of the starting control valve assembly 21 will be described. Referring to FIG. 4, a connecting passage 23 is formed in the valve bodies 22 forming the starting control valve assembly 21, along the width direction. Air introduction inlets 24 are provided above the valve bodies 22, pipes (not shown) connected to the air cleaner 25 are connected to the air introduction inlets 24, and air is supplied to the connecting passage 23 through the air introduction inlets.

Joint pipes 26 for connecting to the respective bypass tubes 17 are also provided in the valve bodies 22. The inside of the joint pipes 26 and the connecting passages 23 are mutually connected through the flow paths 27. That is, the joint pipes 26 constitute a supply path for supplying air to each throttle body 13.

Starter valves 28 are provided between the connecting passages 23 and the flow paths 27. The starter valves 28 have valve members 30 provided so as to be slidable within slide holes 29 formed in the valve bodies 22, and tuning screws (adjustment sections) 31 screwed into the tips of the valve members 30. If a tuning screw 31 is rotated, the valve member 30 slides into the slide hole 29 by a distance corresponding to the extent to which the adjustment screw 31 is screwed in to the valve member 30.

The opening amount of the flow path 27 connecting the connecting passage 23 and the inside of the joint pipes 26 is then adjusted by the sliding movement of the valve members 30.

Therefore, the flow amount of air supplied from the air cleaner 25 to the intake port 13*a* of each throttle body 13 through the valve body 22 and the bypass tube 17 is adjusted by rotating the tuning screw 31 of the starter valve 28.

The starter valves 28 are provided in the valve bodies 22 arranged in a line facing in the same direction as the head portion 31*a* of the tuning screws 31.

A shaft 32 is provided in the valve body 22, along the direction in which the starter valves 28 are arranged, and a lever plate 33 is provided on this shaft 32, capable of turning about the axis of the 30 shaft 32. A lever section 34 for engaging with the head portions 31*a* of the tuning screws 31 of the starter valves provided for each cylinder is formed in the lever plate 33. This lever plate 33 is biased by a spring (not shown in the drawings), and an adjustment screw 31 that has been engaged with the lever section 34 is forced in the direction of the tip section by this spring.

Turning of this lever plate 33 in the direction of the spring force is regulated by an idler screw 35. The position to which the lever plate 33 is turned in the direction of the spring force is adjusted by adjusting the amount that this idler screw 35 is screwed in, and the positions of the respective starter valves 28 are adjusted together.

Furthermore, a wire attachment section 36 is formed in the lever plate 33 at an opposite side to the lever section 34. An end of a wire, not shown in the drawings, that has been guided from a choke lever (not shown) is connected to this wire attachment section 36.

If this wire is pulled, the lever plate 33 is turned in the reverse direction, against the force of the spring, and all the starter valves 28 are pulled back to the rear side. In this way, the opening amount of the flow path 27 between the connecting passage 23 and the inside of the joint pipes 26 is increased and the intake amount to the intake port 13*a* of each throttle body 13 is increased.

Namely, this starting control valve assembly 21 can simultaneously increase the amount of intake to each of the intake ports 13*a* to carry out favorable starting of the engine, by pulling the wire connected to the lever plate 33. Also, after the position of a reference starter valve 28 has been adjusted by rotating the idler screw 35, the idle opening amount of all of the starter valves 28 between the cylinders can be simply adjusted by rotating the tuning screws 31 of the other starter valves 28.

In this way, the above described embodiment of a starting control valve assembly 21 has the starter valves 28 necessary for each cylinder provided together in a single valve body 22. Since the valve body 22 and each throttle body 13 are connected through the bypass tube 17, the direction of the tuning screws 31 of the starter valves 28 can be freely chosen without being limited by the distribution position of the throttle body 13. In contradistinction, in the structure of the related art, respective starter valves 28 are provided in each throttle body 13, it is difficult to achieve good layout design freedom and thus space cannot be utilized effectively.

It is also possible to reduce the manufactured length of the flow path of the throttle body 13 and the complexity of its shape, and in this way the manufacturing cost of the throttle body 13 can be reduced.

In a motorcycle provided with the above described starting control valve assembly 21, the idle opening amount for each throttle is adjusted. When tuning is carried out between cylinders, a fuel tank 42 housed on the vehicle frame 41 is first of all lifted slightly. Tuning is preferably carried out by inserting a spanner between the starting control valve assembly 21 and the vehicle frame 41 and turning a convex portion of the tuning screw 31 using the spanner.

In this way, by using the starting control valve assembly 21 that has starter valves 28 provided together with the valve bodies 22, tuning of the engine after being mounted in a motorcycle, etc. can be carried out extremely easily from one side. Therefore, it is possible to reduce the time and effort required for vehicle maintenance.

In the above described embodiment, the starting control valve assembly 21 has been provided in the throttle body 11 of a V-type engine, but the engine type is not limited to V-type, but is also applicable to an L-type engine.

Figure 5:
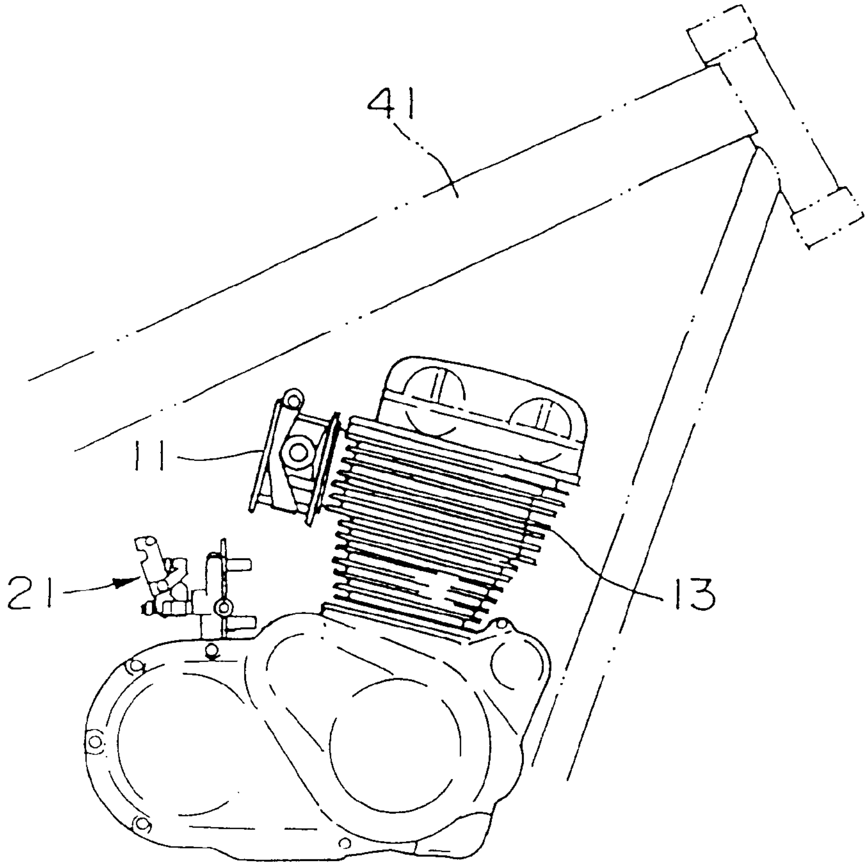
FIG. 5 is a partial side view of a vehicle illustrating an example in which the starting control valve assembly of an embodiment of the present invention has been applied to a vehicle housing an Ltype engine.
Figure 6:
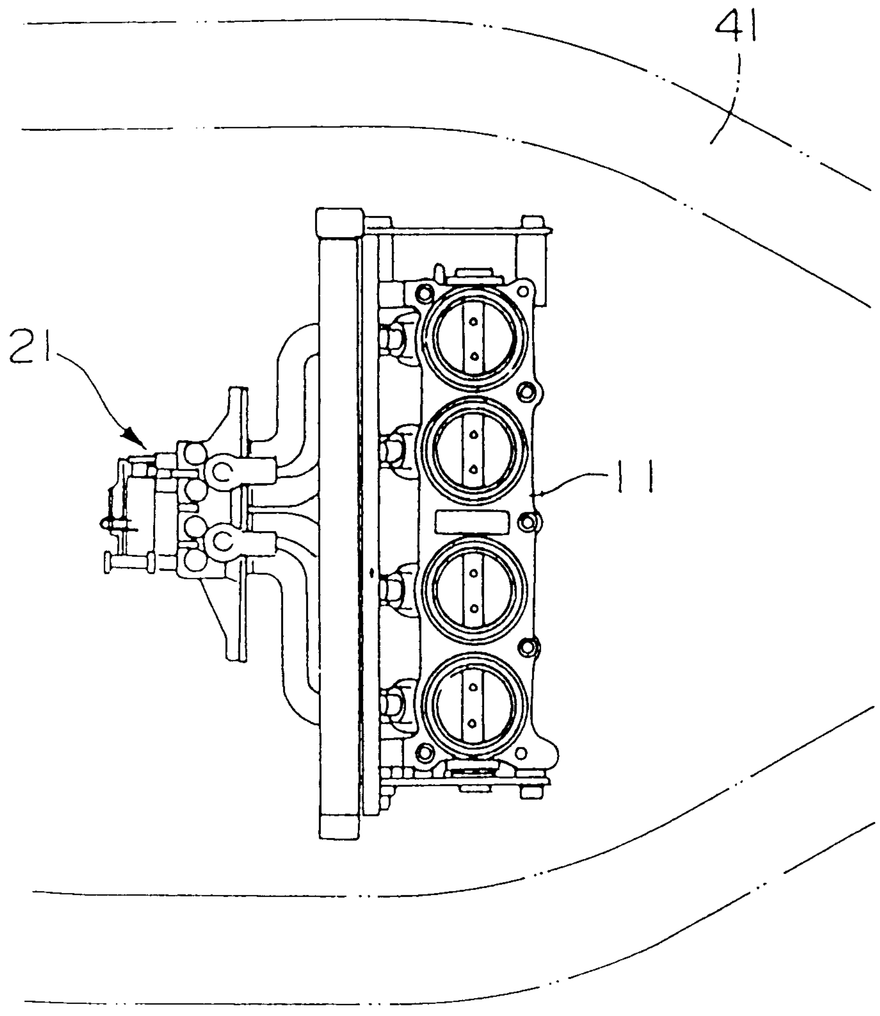
FIG. 6 is a partial plan view illustrating an example in which the starting control valve assembly of an embodiment of the present invention has been applied to a vehicle housing an L-type engine.
Figure 7:
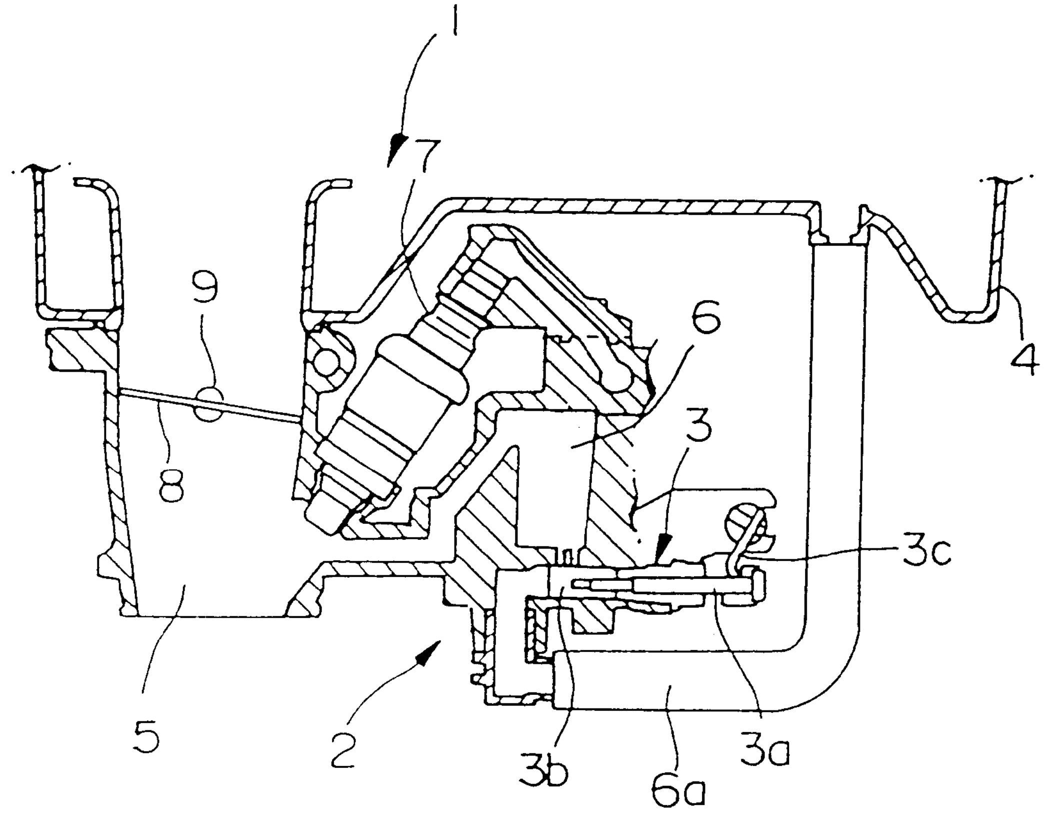
Fig. 7 BACKGROUND ART
FIG. 7 is a cross sectional view of a throttle body for describing the structure and composition of a throttle body of the related art provided with a starter valve.

FIG. 5 and FIG. 6 illustrate an L-type engine 13 having a cylinder mounted at the front of a vehicle frame, and provided with a crank case from a lower end of the cylinder to the rear side of the vehicle frame. In this case, the starting control valve assembly 21 is arranged between the rear side of the cylinder of the engine and the throttle body 11 provided on the cylinder and the upper side of the crankcase, so that the heads 31*a* of the tuning screws 31 are facing towards the rear.

In this case, it is also extremely easy to adjust the tuning screws 31 of the starting control valve assembly 21.

According to the starting control valve assembly for a multiple throttle of the present invention, as described above, the following effects can be obtained.

According to the starting control valve assembly for a multiple throttle of the present invention, starter valves necessary for each cylinder are collectively provided in a single valve body. This valve body and each throttle body are connected through a by-pass tube. Therefore, compared to the structure of the related art in which respective starter valves are provided in each throttle body, the direction in which the starter valves face can be freely chosen without being restricted by the arrangement of the throttle body, and excellent layout design freedom can be provided. Space can thus be utilized effectively.

It is also possible to reduce the manufactured length of the flow path of the throttle body 13 and the complexity of its shape, and in this way the manufacturing cost of the throttle body 13 can be reduced.

According to the starting control valve assembly for a multiple throttle of the present invention, all the starter valves face in one direction and are arranged in a line. Therefore, it is easy to carry out adjustment using the adjustment sections, and maintenance work can be made more efficient.

According to the starting control valve assembly for a multiple throttle of the present invention, it is possible to carry out adjustment from the rear of a vehicle.

According to the starting control valve assembly for a multiple throttle of the present invention, adjustment can be carried out at the side of a vehicle using the adjustment sections by inserting a spanner between a frame and an engine.

According to the starting control valve assembly for a multiple throttle of the present invention, it is possible to carry out adjustment using the adjustment sections between a lateral frame at the rear of a vehicle.

According to the starting control valve assembly for a multiple throttle of the present invention, air within a flow path inside the valve body can be favorably supplied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A starting control valve assembly for a multiple throttle having a plurality of throttle bodies with intake ports for introducing a mixture to each combustion chamber of a multiple cylinder engine, said starting control valve assembly for supplying air from an air cleaner to said intake ports via bypass channels, comprising:

a plurality of valve bodies, each of said plurality of valve bodies for connecting to the intake port of one of the plurality of throttle bodies through one of the bypass channels, air being distributed to each intake port through the bypass channels; and a plurality of starter valves, each of said plurality of starter valves having an adjusting section for adjusting a flow amount of air supplied to the intake ports of the plurality of throttle bodies, each of said plurality of starter valves being integrally provided in one of said plurality of valve bodies independently of each of the plurality of throttle bodies.

2. The starting control valve assembly for a multiple throttle according to claim 1, wherein each of said plurality of starter valves are provided in one of said plurality of valve bodies, arranged in a line facing in a same direction as said adjusting sections.

3. The starting control valve assembly for a multiple throttle according to claim 2, wherein said adjusting sections are oriented to face toward a rear of a vehicle, above the plurality of throttle bodies and below the air cleaner.

4. The starting control valve assembly for a multiple throttle according to claim 2, wherein the engine is a V-type engine having cylinders respectively slanting towards the front and rear of a vehicle, and said plurality of valve bodies are provided between the cylinders on one side of the vehicle, and between the engine and a frame provided in a lateral direction of the vehicle.

5. The starting control valve assembly for a multiple throttle according to claim 2, wherein said engine is an L-type engine having cylinders provided at the front side of a vehicle body and a crankcase provided from a lower end of the cylinders to the rear side of the vehicle body, and said valve bodies are provided between a rear side of the vehicle body where the cylinders are arranged with said plurality of throttle valves provided thereon, and a frame provided in a lateral direction of the vehicle body.

6. The starting control valve assembly for a multiple throttle according to claim 1, wherein said valve bodies are arranged at a position higher than a point of connection between said throttle bodies and said bypass tubes.

7. A multiple throttle comprising:

a plurality of throttle bodies, each of the throttle bodies having an intake port for introducing a mixture to a combustion chamber of a multiple cylinder engine;

a plurality of bypass channels, each of the bypass channels being connected to one of the intake ports of the throttle bodies;

a plurality of valve bodies, each of the valve bodies being connected to one of the bypass channels, air from an air cleaner being distributed to each of the intake ports through the bypass channels; and a plurality of starter valves, each of the starter valves having an adjusting section for adjusting a flow amount of air supplied to the intake ports of the throttle bodies, and being integrally provided in the valve bodies independently of the throttle bodies.

8. The multiple throttle according to claim 7, wherein each of the starter valves are provided in one of the valve bodies, arranged in a line facing in a same direction as the adjusting sections.

9. The multiple throttle according to claim 8, wherein the adjusting sections are oriented to face toward a rear of a vehicle, above the throttle bodies and below the air cleaner.

10. The starting control valve assembly for a multiple throttle according to claim 8, wherein the engine is a V-type engine having cylinders respectively slanting towards the front and rear of a vehicle, and said valve bodies are provided between the cylinders on one side of the vehicle, and between the engine and a frame provided in a lateral direction of the vehicle.

11. The multiple throttle according to claim 8, wherein said engine is an L-type engine having cylinders provided at the front side of a vehicle body and a crankcase provided from a lower end of the cylinders to the rear side of the vehicle body, and said valve bodies are provided between a rear side of the vehicle body where the cylinders are arranged with the throttle valves provided thereon, and a frame provided in a lateral direction of the vehicle body.

12. The multiple throttle according to claim 7, wherein the valve bodies are arranged at a position higher than a point of connection between the throttle bodies and the bypass tubes.

13. A starting control valve assembly for supplying air from an air cleaner to intake ports of a multiple throttle:

a plurality of valve bodies, each of said plurality of valve bodies comprising:

an air inlet for communicating with the air cleaner;

an air outlet for communicating with the intake ports of the multiple throttle;

a communication passage communicating between said air inlet and said air outlet; and a starter valve having an adjusting section for adjusting a flow amount of air supplied through said communication passage, wherein said starter valves are integrally provided in said valve bodies independently of the multiple throttle.

14. The starting control valve assembly according to claim 13, wherein said starter valves are arranged in a line facing in a same direction as said adjusting sections.

15. The starting control valve assembly according to claim 14, wherein the positions of said starter valves are adjustable simultaneously by an adjusting mechanism.

16. The starting control valve assembly according to claim 13, wherein said communication passage includes a first passage and a second passage in communication with each other, said first passage communicating with said air outlet and said second passage communicating with said air inlet.

17. The starting control valve assembly according to claim 16, wherein said second passage extends between adjacent valve bodies to communicate each of said valve bodies to each other.

18. The starting control valve assembly according to claim 16, wherein said adjusting sections of said starter valves adjust the opening amount of said first communication passages.

* * * * *